US012388522B2

(12) United States Patent
Diaz Sendra et al.

(10) Patent No.: US 12,388,522 B2
(45) Date of Patent: Aug. 12, 2025

(54) TELECOMMUNICATIONS NETWORK

(71) Applicant: British Telecommunications Public Limited Company, London (GB)

(72) Inventors: Salva Diaz Sendra, London (GB); Keith Briggs, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 472 days.

(21) Appl. No.: 17/757,279

(22) PCT Filed: Nov. 19, 2020

(86) PCT No.: PCT/EP2020/082676
§ 371 (c)(1),
(2) Date: Jun. 13, 2022

(87) PCT Pub. No.: WO2021/115755
PCT Pub. Date: Jun. 17, 2021

(65) Prior Publication Data
US 2023/0006731 A1      Jan. 5, 2023

(30) Foreign Application Priority Data

Dec. 13, 2019 (GB) ..................... 1918365

(51) Int. Cl.
*H04W 52/02* (2009.01)
*H04B 7/185* (2006.01)
(Continued)

(52) U.S. Cl.
CPC ........ *H04B 7/18513* (2013.01); *H04W 76/10* (2018.02); *H04W 84/06* (2013.01)

(58) Field of Classification Search
None
See application file for complete search history.

(56) References Cited

U.S. PATENT DOCUMENTS 6,643,273 B2  11/2003 Chao
8,165,607 B2   4/2012 Lin et al.
(Continued)

FOREIGN PATENT DOCUMENTS

JP              5836982 B2    12/2015
WO     WO-2018052744 A2     3/2018
WO     WO-2019153197 A1     8/2019

OTHER PUBLICATIONS

3GPP TR 38.811 V15.1.0 (Jun. 2019), "3rd Generation Partnership Project; Technical Specification Group Radio Access Network; Study on New Radion (NR) to Support Non-Terrestrial Networks", Jun. 2019, (Release 15); 7.3.2.3 Initial synchronization in downlink, XP 051785396, 126 pages.
(Continued)

*Primary Examiner* — Gary Lafontant
(74) *Attorney, Agent, or Firm* — EIP US LLP

(57) ABSTRACT

A method of operating a wireless telecommunications network includes identifying a signal coverage area of a moving base station, that forms part of a first telecommunications network, to which to allocate a first physical network identifier, determining a second physical network identifier for enabling user equipment to access an access point that serves the identified signal coverage area, wherein the access point is stationary relative to the moving base station and forms part of a second wireless telecommunications network, and associating the first physical network identifier with the second physical network identifier. The method further includes allocating the first physical network identifier to the moving base station to allow user equipment within the signal coverage area to access the moving base station via the first physical network identifier when the moving base station is providing a telecommunications signal in the identified signal coverage area.

20 Claims, 2 Drawing Sheets

(51) Int. Cl.
*H04W 76/10* (2018.01)
*H04W 84/06* (2009.01)

(56) References Cited

U.S. PATENT DOCUMENTS

| | | | |
|---|---|---|---|
| 10,009,093 B2 | 6/2018 | Purkayastha et al. | |
| 11,716,775 B2* | 8/2023 | Luo | H04W 76/11 370/329 |
| 2018/0241464 A1 | 8/2018 | Michaels | |
| 2019/0037525 A1* | 1/2019 | Liu | G01S 5/0036 |
| 2019/0208487 A1 | 7/2019 | Iijima et al. | |

OTHER PUBLICATIONS

3GPP TR 38.821 V0.6.0 (Apr. 2019) "3rd Generation Partnership Project; Technical Specification Group Radio Access Network; Solutions for NR to Support Non-Terrestrial Networks (NTN)," (Release 16), Apr. 2019, 55 pages.

Combined Search and Examination Report under Sections 17 and 18(3) for Great Britain Application No. 1918365.6, mailed on May 19, 2020, 7 pages.

Huawei: "Handling of Network Identities in NTN", 3GPP Draft; R3-186695 Discussion on Handling of Network IDENTITIES_V1, 3rd Generation Partnership Project (3GPP), Mobile Competence Centre; 650, Route Deslucioles; F-06921 Sophia-Antipolis Cedex; vol. RAN WG3, No. Spokane, US; Nov. 12, 2018-2018111611, Nov. 2018 (Nov. 11, 2019), XP051558464, Retrieved from https://www.3gpp.org/ftp/tsg_ran/WG3_lu/TSGR3_102/Docs/R3-186695.zip, on Nov. 11, 2018, 2 pages.

Huawei: "Handling of Network Identities in NTN", 3GPP Draft; R3-190645, Handling of Networkidentities in NTN V0, 3rd Generation Partnership Project (3GPP), Mobile Competence Centre; 650, Route Deslucioles; F-06921 Sophia-Antipolis Cedex; France, vol. RAN WG3, No. Athens, Greece; Feb. 15, 2019, XP051604581, Retrieved from https://www.3gpp.org/ftp/tsg_ran/WG3_lu/TSGR3_103/Docs/R3-190645.zip, on Feb. 15, 2019, 4 pages.

Huawei: "The Neighbour Cells Management in NTN", 3GPP Draft; R3-193212 Neighbor_NTN R1, 3rd Generation Partnership Project (3GPP), Mobile Competence Centre ; 650, Route Deslucioles; F-06921 Sophia-Antipolis Cedex; France, vol. RAN WG3, No. Reno, Nevada, US;May 13, 2019-May 17, 2019 May 21, 2019, XP051740772, Retrieved from https://www.3gpp.org/ftp/tsg_ran/WG3_lu/TSGR3_104/Docs/R3-193212.zip, on 2619-05-21, Section 2.1, section 5, 5 pages.

International Search Report and Written Opinion for Application No. PCT/EP2020/082676, mailed on Feb. 25, 2021, 15 pages.

Stellarix, "Novelty Search Report—A33864—PCIs for Satellite Networks," May 30, 2019, 32 pages.

Thales (Email Discussion Rapporteur): "[108#06] [NTN] Earth Fixed vs. Earth Moving Cells in NTN LEO (Thales)", 3GPP Draft; R2-1916351, 3rd Generationpartnership Project (3gpp), Mobilecompetence Centre ; 650, Route Deslucioles ; F-06921 Sophia-Antipolis Cedex; France, vol. RAN WG2, No. Reno, USA; Nov. 18, 2019-201911222, Dec. 2, 2019, XP051833995, Retrieved from https://ftp.3gpp.org/tsg_ran/WG2_RL2/TSGR2_108/Docs/R2-1916351.zip, R2-1916351 Earth Fixed and Moving Cells_v10, 38 pages.

* cited by examiner

TELECOMMUNICATIONS NETWORK

PRIORITY CLAIM

The present application is a National Phase entry of PCT Application No. PCT/EP2020/082676, filed Nov. 19, 2020, which claims priority from GB Patent Application No. 1918365 filed Dec. 13, 2019, each which is hereby fully incorporated herein by reference.

TECHNICAL FIELD

The present disclosure relates to a method of operating a telecommunications network, and in particular for integrating terrestrial and satellite telecommunications network.

BACKGROUND

The $3^{rd}$ Generation Partnership Project (3GPP™) is working to integrate satellite telecommunications networks with terrestrial telecommunications networks (see, for example, 3*GPP TR* 38.811—*Study on New Radio (NR) to support non-terrestrial networks and* 3*GPP TR* 38.821—*Solutions for NR to support non-terrestrial networks*).

Currently, in order to implement a 3GPP Radio Access Network, Physical-layer Cell Identifiers (PCIs) are required. From the perspective of User Equipment (UE), the PCI effectively identifies a cell. However, PCI values are not necessarily unique across a network, and may be duplicated across networks and even within a single network. Allocation of PCIs is dictated by collision- and confusion-avoidance rules. Furthermore, PCI values may also be non-static and may be allocated automatically by self-configuring functions of Self Organizing Networks (SON).

However, telecommunications signal beams of Low Earth Orbit (LEO) and Medium Earth Orbit (MEO) satellites over the Earth's surface constantly change and the satellite that serves a given area also periodically changes. If such satellites maintain a constant PCI as they orbit, UEs on Earth will need to perform full signalling handover each time another satellite becomes a UE's best server, which is inefficient (with regards, at least, to energy, signalling and computational processing resources). Furthermore, even if satellites along the same trajectory were set to have the same PCI, a given trajectory will likely cross different regions (e.g. countries) and different terrestrial telecommunications network operators in these regions may have different rules for PCI planning.

It is desirable to at least alleviate some of the aforementioned problems.

SUMMARY

According to a first aspect of the present disclosure, there is provided a method of operating a wireless telecommunications network, the method comprising: identifying a signal coverage area of a moving base station to which to allocate a first physical network identifier, the moving base station forming part of a first telecommunications network; determining a second physical network identifier for enabling access, by user equipment, to an access point that serves the identified signal coverage area, wherein the access point is stationary relative to the moving base station and forms part of a second wireless telecommunications network; associating the first physical network identifier with the determined second physical network identifier; and allocating the first physical network identifier to the moving base station when the moving base station is providing a telecommunications signal in the identified signal coverage area, in order to allow access, by user equipment within the signal coverage area, to the moving base station via the first physical network identifier.

In embodiments, the first and/or the second physical network identifier(s) can exclude(s) a: gNodeB identifier; a cell identifier; and/or a Type Allocation Code. In embodiments, the first and/or second physical network identifier(s) comprise(s) a Primary Synchronization Signal (PSS) and a Secondary Synchronization Signal (SSS). In embodiments, the first and/or the second physical network identifier(s) is/are provided in a protocol other than a Radio Resource Control protocol. Optionally, the method is for operating the first and/or the second telecommunications network(s).

In embodiments, the method further comprises identifying a geographic position of the access point, and wherein determining the second physical network identifier is performed in dependence upon identifying an overlap in the identified geographic position of the access point and the identified signal coverage area.

In embodiments, the user equipment is a wide-area mobile telecommunications device, a relay, a repeater or Integrated Access and Backhaul equipment. In embodiments, the user equipment is configured to connect directly to the moving base station and/or to the access point. In embodiments, the moving base station and the access point are configured to communicate wirelessly. In embodiments, the moving base station moves by orbiting or by drifting (such as per a lighter-than-air vehicle).

In embodiments, the second telecommunications network comprises a plurality of access points, each of which is stationary relative to the moving base station. In some embodiments the first telecommunications network comprises a plurality of moving base stations.

In embodiments, the allocated first physical network identifier is selected from a predetermined list of first physical network identifiers.

As used herein, an access point "that serves the identified signal coverage area" connotes the access point serving at least part of, all of, or only all of the identified signal coverage area. In embodiments, the first and the second physical network identifiers are in the form of Physical-layer Cell Identifiers (PCIs).

In embodiments, the allocated first physical network identifier is allocated to the moving base station only whilst it is providing a telecommunications signal in the signal coverage area to the access point. In embodiments, the first physical network identifier is allocated to successive moving base stations as and when they provide a telecommunications signal in the signal coverage area to the access point. In embodiments, a given first physical network identifier is allocated to only one moving base station at a time.

In embodiments, the method further comprises: the first telecommunications network generating the first physical network identifier; and the second telecommunications network generating the second physical network identifier. In embodiments, said generating is performed in a network core of the corresponding telecommunications network.

In embodiments, the signal coverage area of the moving base station serves a new signal coverage area as the moving base station moves, and wherein the method is initiated upon identifying a change in the signal coverage area of the moving base station. In embodiments, the method is initiated upon identifying a change in the first physical network identifier and/or the second physical network identifier.

In embodiments, the method is re-initiated after a predetermined period of time, and wherein said period is the time after which the moving base station no longer provides the telecommunications signal in the signal coverage area, but instead to a new signal coverage are. In some embodiments, said period is the shortest such period of time.

In embodiments, the first and/or second physical network identifier/s is/are generated by a self-configuration function. In embodiments, the self-configuration function is a Self-Organizing Network function. In embodiments, the self-configuration function is implemented in a network core. In embodiments, the method further comprises receiving the first physical network identifier from the first telecommunications network. In embodiments, determining the second physical network identifier comprises receiving the second physical network identifiers from the second telecommunications network.

In embodiments, identifying the signal coverage area comprises receiving beam pattern information of the telecommunications signal from the moving base station and/or from positional information of the moving base station, as received from the first telecommunications network.

In embodiments, the signal coverage area is provided by at least one beam transmitted by the moving base station. In embodiments, the beam pattern information comprises a beam angle; and/or a beam solid angle. In embodiments, the positional information comprises: position of the moving base station relative to Earth and/or the access point (and in some embodiments altitude); a trajectory of the moving base station relation to the access point; an orbital velocity of the moving base station relation to the access point.

In embodiments, allocating the first physical network identifier to the moving base station further comprises the first telecommunications network receiving the allocated first physical network identifier from the second telecommunications network. In embodiments, the aforementioned receiving is performed by means of a network interface that communicatively connects the first and the second telecommunications networks.

In embodiments, the moving base station is an aerial base station. As used herein, the term "aerial" can include space. In embodiments, the moving base station is configured to operate at a high-altitude. In various embodiments, the moving base station is configured to operate at one or more of an altitude of at least 10 km, 30 km, 100 km, and 500 km. In embodiments, the moving base station is configured to operate at an altitude of no more than 2000 km. In other embodiments, the moving base station is configured to operate at an altitude of no more than 3000 km.

In embodiments, the moving base station forms part of: an Unmanned Vehicle (e.g. a drone or a lighter-than-air vehicle); an automotive vehicle; an aircraft; and/or a train; and/or a marine vehicle. Optionally, the moving base station is self-propelled.

In embodiments, the moving base station forms part of a vehicle having a known or predictable path of movement, such as owing to a predetermined schedule and/or constrained movement (such as railway tracks for a train).

In embodiments, the second telecommunications network is a terrestrial telecommunications network. In embodiments, the second telecommunications network operates in accordance with 3G, 4G and/or 5G standards. In embodiments, the first and the second telecommunications networks comprise separate network cores. In embodiments, the first and the second telecommunications networks are operated by independent network operators. In embodiments, the first and the second telecommunications networks are wide-area and/or cellular telecommunications networks.

In embodiments, the moving base station forms part of a satellite and the first telecommunications network is a satellite telecommunications network. In embodiments, the satellite follows a non-geostationary orbit. In embodiments, the satellite follows low- or medium-Earth orbit. In embodiments, the satellite telecommunications network comprises a constellation of a plurality of satellites.

In embodiments, the moving base station and the access point broadcast at the same spectral frequency, and wherein the first and the second physical network identifiers are different to one another. In other embodiments, the moving base station and the access point broadcast at the different spectral frequencies, and wherein the first and the second physical network identifiers are identical.

In embodiments, the identified first physical network identifier is simultaneously associated with a plurality of second physical network identifiers, wherein the plurality of second physical network identifiers are associated with a plurality of access points that are located in the identified signal coverage area.

In embodiments, the moving base station provides a plurality of signal coverage areas by means of a plurality of beams, and wherein a method as described herein is performed for each beam.

According to another aspect of the present disclosure, there is provided a telecommunications system, comprising: a first telecommunications network comprising a moving base station; a second telecommunications network comprising a stationary access point; and an interface for providing a communications link between the first and the second telecommunications networks, wherein the system is configured to perform a method as described above.

According to yet another aspect of the present disclosure, there is provided a terrestrial telecommunications network, comprising: a network interface for communicatively interfacing with a further telecommunications network, wherein the network interface is configured to receive from the further telecommunications network: a signal coverage area of a moving base station, the moving base station forming part of the further telecommunications network; and a first physical network identifier for enabling access, by user equipment, to the moving base station; a wireless access point having allocated to it a second physical network identifier for enabling access, by user equipment, to the wireless access point, wherein the wireless access point is stationary relative to the moving base station; a processor configured to: determine the second physical network identifier of the wireless access point that serves the signal coverage area of the moving base station; and associate the received first physical network identifier with the determined second physical network identifier; and a controller for communicating, to the further telecommunications network, via the network interface, the associated first physical network identifier so as to cause the further telecommunications network to allocate the associated first physical network identifier to the moving base station when said moving base station is providing a telecommunications signal in the signal coverage area.

The present disclosure includes any novel aspects described and/or illustrated herein. The present disclosure also extends to methods and/or apparatus substantially as herein described and/or as illustrated with reference to the accompanying drawings. The present disclosure is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The present disclosure also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the present disclosure may be applied, in any appropriate combination, to other aspects of the present disclosure. Any, some, and/or all features in one aspect can be applied to any, some, and/or all features in any other aspect, in any appropriate combination. Particular combinations of the various features described and defined in any aspects of the present disclosure can be implemented and/or supplied and/or used independently.

As used throughout, the word 'or' can be interpreted in the exclusive and/or inclusive sense, unless otherwise specified.

BRIEF DESCRIPTION OF DRAWINGS

The present disclosure extends to a method of operating a wireless telecommunications network, a telecommunications system and a terrestrial telecommunications network substantially as described herein and/or substantially as illustrated with reference to the accompanying drawings. The present disclosure is now described, purely by way of example, with reference to the accompanying diagrammatic drawings, in which.

DETAILED DESCRIPTION

Figure 1:
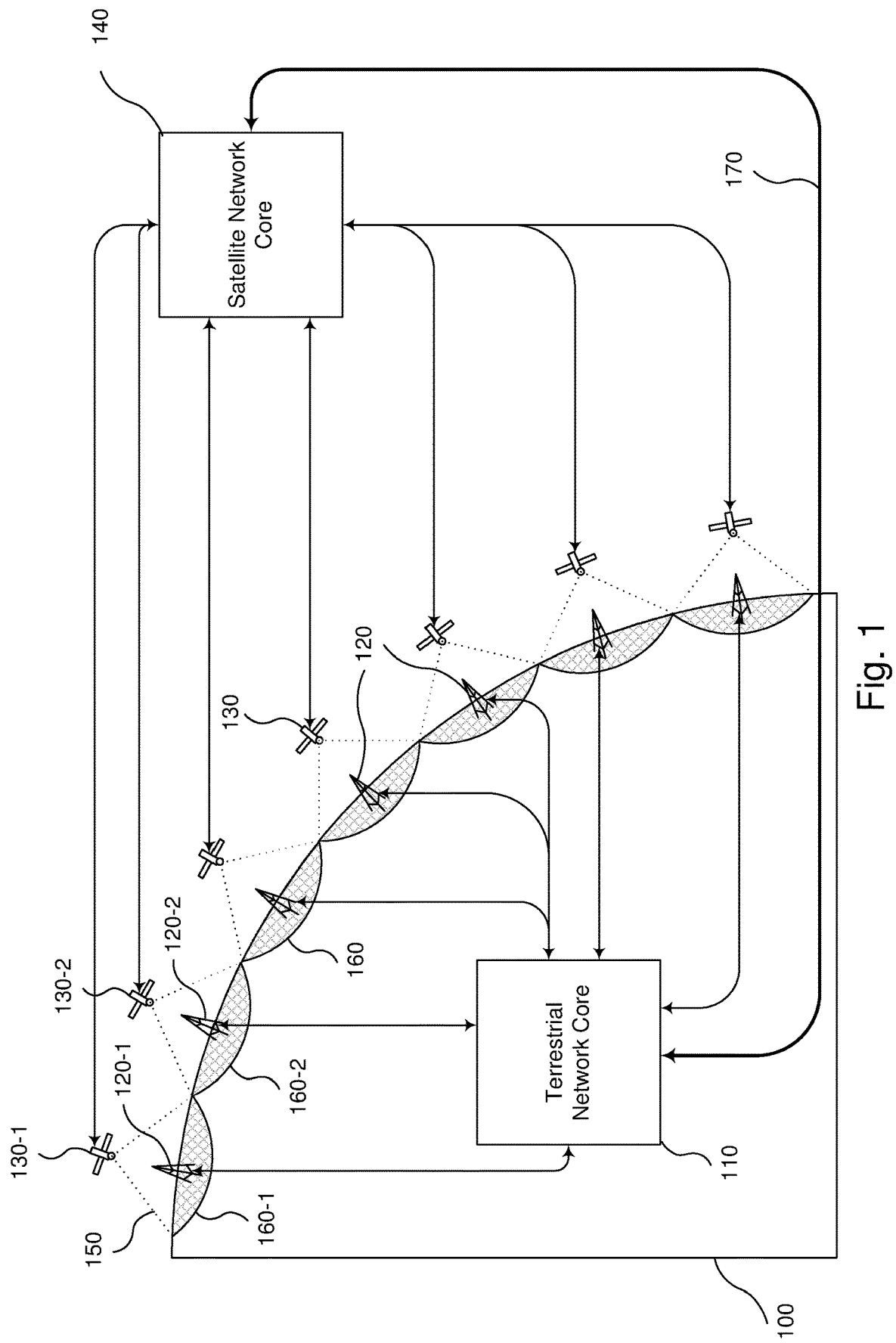
FIG. 1 is a schematic diagram of terrestrial and satellite telecommunications networks according to embodiments.

FIG. 1 is a schematic diagram showing a portion of Earth 100, on which there is provided a terrestrial telecommunications network.

Terrestrial Network

The terrestrial telecommunications network is in the form of a wide-area cellular wireless telecommunications network (for example, as per 3G, 4G and/or 5G standards), and comprises a Terrestrial Network Core (TNC) 110 to which a plurality of wireless access points, in the form of stationary radio access points 120, are connected, which provide a cellular Radio Access Network (RAN). In particular, there are provided first 120-1 and second 120-2 radio access points. For the sake of clarity, the geographical extent of the terrestrial telecommunications network shown in FIG. 1 is exaggerated.

The TNC 110 is configured, at least, to control the terrestrial telecommunications network and to allocate terrestrial physical network identifiers to each radio access point 120, thereby to help enable effective access to the terrestrial telecommunications network by User Equipment (not shown). For example, the terrestrial physical network identifiers include a Physical-layer Cell Identifier (PCI).

Satellite Network

There is also provided a further—independent—telecommunications network in the form of a satellite telecommunications network that comprises a plurality of moving base stations, in the form of aerial moving base stations, and also in the form of satellites 130, arranged as a constellation, and moving (along an orbital path) relative to the surface of Earth 100. The satellite telecommunications network also comprises a Satellite Network Core (SNC) 140 (which may be terrestrially-based).

Each satellite 130 transmits a beam 150 towards Earth 100 so as to provide User Equipment (including, for example, (personal) mobile telecommunications devices, relays, repeaters and Integrated Access and Backhaul (IAB) equipment) with access to the satellite telecommunications network; a geographical position and extent of this beam on Earth is herein referred to as a "signal coverage area" 160. There is provided first 160-1 and second 160-2 signal coverage areas by first 130-1 and second 130-2 satellites respectively; these signal coverage areas are adjacent to one another and overlapping (albeit not visible in FIG. 1).

The SNC 140 is in communication with each satellite 130. Accordingly, the SNC 140 is available, for each satellite 130, to: allocate a physical network identifier to each satellite (or a "satellite physical network identifier"), such as a PCI; determine and/or configure the beam 150 (in terms, at least, of orientation and the solid angle of projection); determine the instantaneous and predicted positions over Earth 100; and/or determine the signal coverage area 160.

Conventionally, satellite physical network identifiers, beam information, positional information, and signal coverage area information are unavailable to the terrestrial telecommunications network.

However, in order better to integrate the satellite and terrestrial telecommunications networks, an interface 170 is provided between the SNC 140 and the TNC 110, which facilitates communication of, at least, such information therebetween. In particular, the interface 170 communicates with a Self-Organizing Network function of the TNC 110 and/or SNC 140, which allocates the terrestrial and satellite physical network identifiers for the radio access points 120 and the satellites 130, respectively.

In one example, the interface 170 is in the form of a telecommunications link (such as a fiber optic link or a wireless microwave link) and routing equipment.

Figure 2:
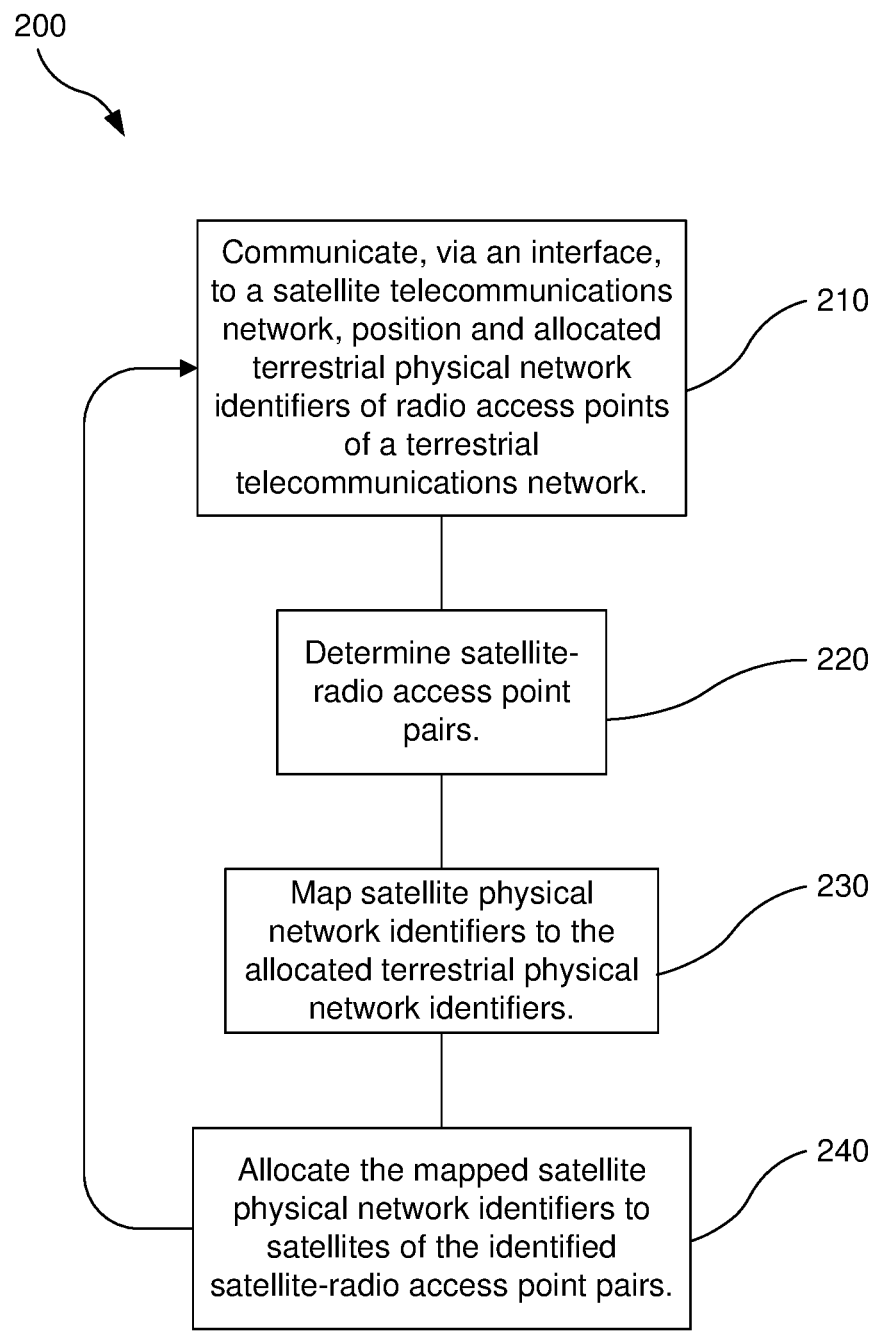
FIG. 2 is a flowchart of a process for operating the terrestrial and the satellite telecommunications networks according to embodiments.

FIG. 2 shows a process 200 of operating the satellite and terrestrial telecommunications networks.

At 210, the TNC 110 is configured to communicate, via the interface 170, the geographic position of each radio access point 120 (and in particular its cell area) and their allocated terrestrial physical network identifiers (e.g. PCI) to the SNC 140.

At 220, using knowledge of the geographic position of the radio access points 120 from 210, the SNC 140 determines, for each satellite, the radio access point 120 that provides a signal in a cell area that overlaps with the signal coverage area of a given satellite. The SNC thereby identifies pairs of satellites and radio access points that, at a given instant in time, serve the same geographic area; these are herein referred to as 'satellite-radio access point pairs'.

In the example shown in FIG. 1, it is identified by the SNC 140 that the first signal coverage area 160-1, as covered by the first satellite 130-1, coincides with a cell area provided by the first radio access point 120-1; accordingly, the first satellite 130-1 and radio access point 120-1 are identified as a 'satellite-radio access point pair' at the instant shown in FIG. 1. The second satellite 130-2 and the second radio access point 120-2 are also identified as another satellite-radio access point pair for corresponding reasons.

At 230, a mapping is created between each of the terrestrial physical network identifiers of the radio access points 120 and the satellite physical network identifiers. In this way, a given radio access point is associated with a given terrestrial physical network identifier and a given satellite physical network identifier.

In the context of FIG. 1, Table 1 below shows exemplary mappings following 220 and 230.

TABLE 1

Exemplary Mappings

| Radio Access Point | Terrestrial Physical Network Identifier | Satellite Physical Network Identifier |
|---|---|---|
| 120-1 | T1 | S1 |
| 120-2 | T2 | S2 |

At 240, the SNC 140 retrieves the mappings that are generated at 220 and 230, which are utilized to allocate to a given satellite of a satellite-radio access point pair the satellite physical network identifier that corresponds to the terrestrial physical network identifier of the radio access point of that same satellite-radio access point pair. That is, at 240, satellite physical network identifiers are allocated to satellites on the basis of the mappings between satellite and terrestrial identifiers generated at 230 and the pairings determined at 220.

For example, and with reference to Table 1 above, the first satellite 130-1 is allocated the satellite physical network identifier "S1" since this satellite physical network identifier is associated with the radio access point with which the first satellite 130-1 is paired.

By allocating satellite physical network identifiers that are known to the terrestrial telecommunications network, an improved unified telecommunications network is provided that is capable of processing UE handovers to and/or from the satellite telecommunications network in a manner that is invisible to the UE since the mapping of satellite and terrestrial physical network identifiers is retrievable by the SNC 140 (and/or TNC 110), bypassing the need for the UE to do so. Accordingly, from the perspective of a UE, by way of process 200, access to a satellite is performed as the UE would access a radio access point 120.

At a later point in time, the first satellite 120-1 will eventually move, relative to Earth 100 and therefore to a given radio access point 120 also, such that the first satellite 120-1 serves a new signal coverage area 160, such as, for example, the second signal coverage area 160-2. Accordingly, after 240, process 200 is available to reset to 210 (or optionally to 220 if the information that is communicated in 210 is static). In this way, the first satellite 120-1 now serves the second signal coverage area 160-2, which coincides with the cell area of the second radio access point 120-2. The first satellite 120-1 is therefore allocated the satellite physical network identifier that is associated with the second radio access point 120-2 ("T2", in the example of Table 1), or "S2" according to the example shown in Table 1 above.

As a result, process 200 in effect provides satellite physical network identifiers that are spatially static. That is, a given satellite physical network identifier is made to correspond to a specific cell area, and satellites are allocated the satellite physical network identifier of the cell area that they serve at a given instant. As a result, from the perspective of a UE, the satellite physical network identifier for a satellite-radio access point pair does not constantly change as the satellites orbit. Accordingly, the satellite physical network identifiers remain constant in a given signal coverage area despite the satellite that serves a given signal coverage area changing.

This enables more effective mobility management within the network, and avoids the need for UEs to seek updates to the satellite physical network identifiers (e.g. by means of measurement reports as part of an Automatic Neighbor Relations (ANR) process), and this benefit may be realized regardless of whether a UE is currently attached to the SNC 140 or the TNC 110. Furthermore, a UE that is in idle mode may avoid cell reselections, and UEs that are currently disconnected may more quickly attach to the satellite or terrestrial telecommunications network.

Process 200 is available to be initiated or re-initiated (as appropriate) when: the TNC 110 reallocates the terrestrial physical network identifiers; the SNC 140 reallocates the satellite physical network identifiers; and/or after a predetermined period since a previous iteration of process 200, for example after a period by which point a satellite is expected to serve a new signal coverage area.

The satellite and radio access point of a satellite-radio access point pair broadcast at the same frequency, and distinct satellite and terrestrial physical network identifiers helps avoid collisions. However, in another example, broadcasting is performed at different frequencies and the satellite and terrestrial physical network identifiers for a satellite-radio access point pair are identical.

ALTERNATIVES AND MODIFICATIONS

In an alternative example, there are provided a plurality of independently-operated terrestrial telecommunications networks, each with their own set of radio access points and TNCs. The plurality of terrestrial telecommunications networks may or may not be interconnected. In this example, each of the plurality of terrestrial telecommunications networks comprise an interface 170 to the SNC 140 so as to facilitate process 200. In this way, the satellite telecommunications network may be shared by the plurality of terrestrial telecommunications networks.

In another alternative, process 200 is performed such that at the first 210 the SNC 140 is configured to communicate, via the interface 170, to the TNC 110 the signal coverage area of each satellite (or information that will allow the TNC 110 to derive the signal coverage area) and a list of satellite physical network identifiers. The TNC 110 subsequently performs 220 and 230.

In one alternative, the moving base station forms part of any vehicle (self-powered or otherwise), including: automotive vehicles; aircraft; trains; marine vehicles; and/or aerial vehicles (such as UAV or drones, lighter-than-air vehicles or spacecraft more generally). In particular, the moving base station forms part of a vehicle having a known or predictable path of movement.

In yet another alternative example, a, or each, satellite 130 comprise/s a plurality of beams that are configured to serve different radio access points. The SNC 140 therefore also stores information regarding the projection of each beam onto Earth, and therefore has knowledge of the signal coverage area for each beam. Accordingly, process 200 is performed so as to associate radio access points to individual beams and to allocate the physical network identifiers to each beam (in a corresponding manner to 220 and 230 respectively).

In an alternative a one-to-many or many-to-one mapping is available to be provided between satellite and terrestrial network identifiers.

In one example, for geographically-static radio access points, given the typically-predictable trajectory of satellites, once process 200 has been run, the SNC 140 is capable of anticipatorily allocating satellite physical network identifiers to satellites as the satellite-radio access point pairs change without further iterations of process 200, at least until the satellite or terrestrial physical network identifiers are changed and/or the trajectory of the satellites is changed.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a wireless telecommunications network, the method comprising:
   identifying a signal coverage area of a moving base station to which to allocate a first physical network identifier, the moving base station forming part of a first telecommunications network;
   determining a second physical network identifier for enabling access, by user equipment, to an access point that serves the identified signal coverage area, wherein the access point is stationary relative to the moving base station and forms part of a second telecommunications network that is separate from the first telecommunications network;
   associating the first physical network identifier with the second physical network identifier; and
   allocating the first physical network identifier to the moving base station when the moving base station is providing a telecommunications signal in the identified signal coverage area, in order to allow access, by user equipment within the signal coverage area, to the moving base station via the first physical network identifier.

2. The method according to claim 1, wherein the first physical network identifier and the second physical network identifier are in the form of Physical-layer Cell Identifiers (PCIs).

3. The method according to claim 1, wherein the first physical network identifier is allocated to the moving base station only when it is providing the telecommunications signal in the identified signal coverage area to the access point.

4. The method according to claim 1, further comprising:
   the first telecommunications network generating the first physical network identifier; and
   the second telecommunications network generating the second physical network identifier.

5. The method according to claim 1, wherein the identified signal coverage area of the moving base station serves a new signal coverage area as the moving base station moves, and wherein the method of claim 1 is initiated upon identifying a change in the signal coverage area of the moving base station.

6. The method according to claim 1, wherein the method of claim 1 is initiated upon identifying a change in the first physical network identifier or the second physical network identifier.

7. The method according to claim 1, wherein the method of claim 1 is re-initiated after a predetermined period of time, and wherein the predetermined period of time is the time after which the moving base station no longer provides the telecommunications signal in the identified signal coverage area, but instead to a new signal coverage area.

8. The method according to claim 1, wherein at least one of the first physical network identifier or the second physical network identifier is generated by a self-configuration function.

9. The method according to claim 1, further comprising:
   receiving the first physical network identifier from the first telecommunications network; and
   receiving the second physical network identifier from the second telecommunications network.

10. The method according to claim 9, wherein the receiving is performed by a network interface that communicatively connects the first telecommunications network and the second telecommunications network.

11. The method according to claim 1, wherein identifying the signal coverage area further comprises receiving beam pattern information of the telecommunications signal from at least one of the moving base station or from positional information of the moving base station, as received from the first telecommunications network.

12. The method according to claim 1, wherein allocating the first physical network identifier to the moving base station further comprises the first telecommunications network receiving the first physical network identifier from the second telecommunications network.

13. The method according to claim 1, wherein the moving base station is an aerial base station and the second telecommunications network is a terrestrial telecommunications network.

14. The method according to claim 1, wherein the first telecommunications network and the second telecommunications network comprise separate network cores.

15. The method according to claim 1, wherein the first telecommunications network and the second telecommunications network are each a wide-area telecommunications network or a cellular telecommunications network.

16. The method according to claim 1, wherein the moving base station forms part of a satellite and the first telecommunications network is a satellite telecommunications network.

17. The method according to claim 1, wherein the moving base station and the access point broadcast at the same spectral frequency, and wherein the first physical network identifier and the second physical network identifier are different.

18. The method according to claim 1, wherein the moving base station and the access point broadcast at different spectral frequencies, and wherein the first physical network identifier and the second physical network identifier are identical.

19. A telecommunications system, comprising:
   a first telecommunications network comprising a moving base station;
   a second telecommunications network, separate from the first telecommunications network, comprising a stationary access point; and
   an interface for providing a communications link between the first telecommunications network and the second telecommunications network, wherein the system is configured to perform the method of claim 1.

20. A terrestrial telecommunications network, comprising:

a network interface for communicatively interfacing with a further telecommunications network that is separate from the terrestrial telecommunications network, wherein the network interface is configured to receive from the further telecommunications network:
- a signal coverage area of a moving base station, the moving base station forming part of the further telecommunications network; and
- a first physical network identifier for enabling access, by user equipment, to the moving base station;

a wireless access point having allocated to it a second physical network identifier for enabling access, by user equipment, to the wireless access point, wherein the wireless access point is stationary relative to the moving base station;

a processor configured to:
- determine the second physical network identifier of the wireless access point that serves the signal coverage area of the moving base station; and
- associate the first physical network identifier with the second physical network identifier; and a controller for communicating, to the further telecommunications network, via the network interface, the first physical network identifier so as to cause the further telecommunications network to allocate the first physical network identifier to the moving base station when said moving base station is providing a telecommunications signal in the signal coverage area.

* * * * *